United States Patent
Hess et al.

(10) Patent No.: US 6,947,852 B2
(45) Date of Patent: Sep. 20, 2005

(54) MONITORING AND CORRECTING FOR NON-TRANSLATIONAL MOTION IN A RESONANCE MEASUREMENT APPARATUS

(75) Inventors: Harald F. Hess, La Jolla, CA (US); Patrick Rodney Lee, San Diego, CA (US)

(73) Assignee: KLA-Tencor Technologies Corporation, Milpitas, CA (US)

(*) Notice: Subject to any disclaimer, the term of this patent is extended or adjusted under 35 U.S.C. 154(b) by 0 days.

(21) Appl. No.: 10/163,172

(22) Filed: Jun. 4, 2002

(65) Prior Publication Data

US 2004/0039760 A1 Feb. 26, 2004

(51) Int. Cl.⁷ .......................... G01H 1/04; G11B 19/20; G11B 5/596
(52) U.S. Cl. .................. 702/56; 73/1.84; 73/862.541; 324/303; 360/73.03; 360/75; 360/77.04; 360/78.09; 360/244.9; 360/264.4
(58) Field of Search .................. 702/33, 35, 56, 702/113; 73/1.84, 583, 662, 669, 862.541; 324/303; 348/699; 360/75, 104, 109, 125, 133, 77.04, 78.09, 264.4, 244.9, 73.03

(56) References Cited

U.S. PATENT DOCUMENTS

| | | | | |
|---|---|---|---|---|
| 5,361,105 A | * | 11/1994 | Iu | ................................ 348/699 |
| 5,390,543 A | * | 2/1995 | Staple et al. | .................. 73/583 |
| 5,435,168 A | * | 7/1995 | Granere | ........................ 73/1.84 |
| 5,654,841 A | * | 8/1997 | Hobson et al. | ................ 360/75 |
| 5,737,239 A | * | 4/1998 | Horiuchi et al. | ............... 702/56 |
| 5,771,139 A | * | 6/1998 | Lee et al. | .................... 360/109 |
| 5,936,787 A | * | 8/1999 | Ohmi | ....................... 360/73.03 |
| 5,940,251 A | * | 8/1999 | Giere et al. | .............. 360/244.9 |
| 5,979,249 A | * | 11/1999 | Koo et al. | ............. 73/862.541 |
| 6,125,008 A | * | 9/2000 | Berg et al. | ................ 360/264.4 |
| 6,297,632 B1 | * | 10/2001 | Speier | .......................... 324/303 |
| 6,404,590 B1 | * | 6/2002 | Kuo et al. | .................... 360/125 |
| 6,424,492 B1 | * | 7/2002 | Allgood et al. | ............. 360/133 |
| 6,496,323 B1 | * | 12/2002 | Umeda et al. | ........... 360/78.09 |
| 6,600,619 B1 | * | 7/2003 | Morris et al. | .................. 360/75 |
| 6,751,046 B1 | * | 6/2004 | Szita et al. | .............. 360/77.04 |

* cited by examiner

Primary Examiner—Michael Nghiem
Assistant Examiner—John Le
(74) Attorney, Agent, or Firm—Smyrski Law Group, A P.C.

(57) ABSTRACT

A system and method for assessing and potentially correcting for non-translational motion in a resonance measurement apparatus is provided. The design measures the response of an article, such as an HGA assembly including a read/write head, as well as the excitation of a shaking device, such as a head resonance tester, and computes a correction factor using either two or three point measurement. The correction factor may be evaluated by subjecting the arrangement to further vibration at varying frequencies. Measurement of the shaking device may be accomplished using an accelerometer or by optical measurement using a light beam.

35 Claims, 10 Drawing Sheets

MONITORING AND CORRECTING FOR NON-TRANSLATIONAL MOTION IN A RESONANCE MEASUREMENT APPARATUS

BACKGROUND OF THE INVENTION

1. Field of the Invention

The present invention relates generally to the field of resonance compensation, and more specifically to compensating for hard disk drive head suspension mechanical resonance effects, such as torsion and sway.

2. Description of the Related Art

Disk drives are magnetic recording devices used for the storage of digital information. Digital information is recorded on substantially-concentric tracks on either surface of one or more magnetic recording disks. Disks are rotatably mounted on a spindle motor, and read/write heads mounted to actuator arms access information on the disks, with the heads rotated by a voice coil motor (VCM). The voice coil motor rotates the pivoting arms, or suspensions, and moves the heads radially over the surface of the disk or disks. The read/write heads must generally be accurately positioned on the disk to ensure proper reading and writing of information that will define the data storage tracks. After the system writes the servo patterns on the disks, each disk can be added to a hard drive assembly.

The information contained in servo and data tracks on the disk surface must be written in a precise manner. In a typical configuration, one or more data heads are employed and are connected to a rotatable base via a suspension, or arm, that has particular mechanical characteristics. The resonance behavior of the arm is highly determinative of the accuracy of data written and read by the head, as significant resonance in the arm or suspension can significantly disturb head position.

Testing of disk drive suspension mechanical resonance characteristics requires devices such as a Head Resonance Tester, or HRT, to excite various resonance modes on the combined suspension and head assembly by shaking the assembly. The HRT, or shaker, may excite resonance modes within certain ranges, including but not limited to 1 KHz to 40 KHz. If the head is mounted onto the suspension and centered along a suspension axis, the HRT may shake the suspension and head arrangement in a line perpendicular to the suspension axis, which may be called the Z axis. In essence, the base of the suspension is fixed and shaken in a direction perpendicular thereto, such as the arrangement shown in FIG. 6. Loaded HRT 601 includes accelerometer 401, shaker block 402, suspension 404, and head 403. The amplitude of the HRT excitation in the arrangement shown may be measured by the accelerometer 401.

Figure 5:
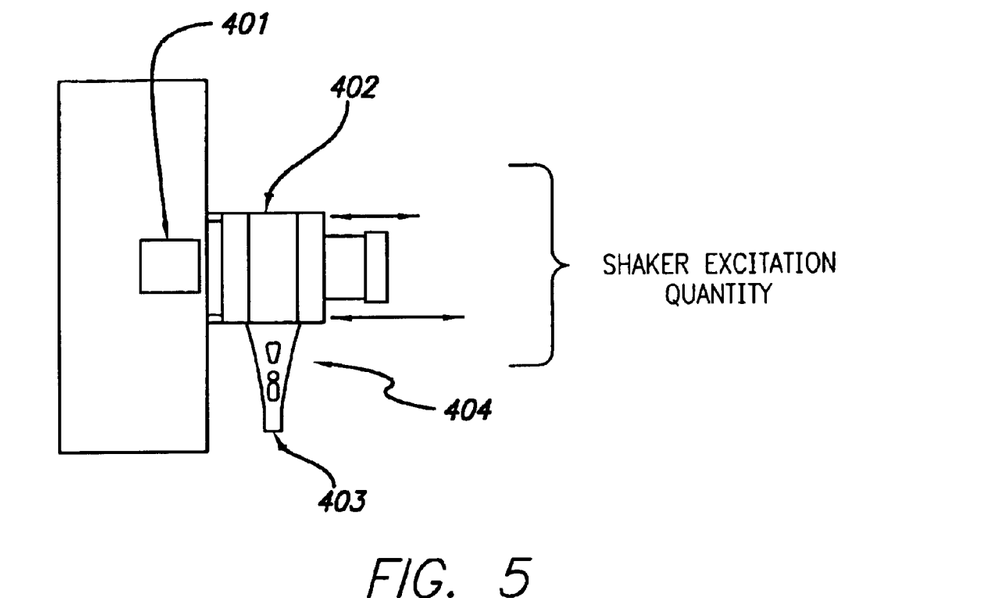
FIG. 5 is a shaker device, accelerometer, and an article such as a suspension and head (HGA) used in one aspect of the current invention encountering non-ideal shaker motion.

For the arrangement shown in FIG. 5, when the direction of acceleration does not remain well aligned in the Z direction, the accuracy of the resonance curve generated by the accelerometer may be compromised. Such misalignment can result from resonance modes in the HRT, which can be very difficult to prevent over large frequency ranges. Further, the interaction between the suspension and the HRT, specifically the action of the suspension resonance on the shaker block, can also cause the suspension to torque and move in directions other than the Z direction in the arrangement shown. The additional movement is not measured by the accelerometer but is a component describing the rotational motion of the shaker block 402. These spurious motions, sometimes referred to as shaker modes, provide an additional non-characterized excitation to the suspension and head and thereby limit the accuracy and usefulness of resonance measurements.

It would be beneficial to have a system that overcomes the shortcomings of previous designs and provides a more accurate assessment and correction of resonance curves for a mechanical arrangement, such as a drive head and suspension combination.

SUMMARY OF THE INVENTION

According to the present invention, there is provided a system and method for assessing and potentially correcting for non-translational motion in a resonance measurement apparatus. The design measures the response of an article, such as an HGA assembly including a read/write head, as well as a more complete characterization of the excitation of a shaking device, such as a head resonance tester, and computes a correction factor using either two or three point measurement. The correction factor generally geometrically relates the measurement at the shaking device and translates it into an excitation measurement at the article, such as the head of the HGA. The correction factor may be evaluated by subjecting the arrangement to further vibration at varying frequencies and assessing the response. Measurement of the shaking device may be accomplished using an accelerometer or by optical measurement using a light beam. Measurement of the article is performed using a light beam, which may be a light beam generated in the same manner as that used to measure the response of the shaking device.

According to one aspect of the present invention, there is provided a method for providing an enhanced response representation for an article mounted to a shaker device. The method comprises measuring an article response quantity at the apparatus, determining a shaker excitation quantity at the shaker device, computing a correction factor geometrically relating the shaker excitation quantity to the article response quantity, and determining the response representation based on applying the correction factor to raw shaker and article data.

According to a second aspect of the present invention, there is provided a system for determining an excitation representation of a shaking device having an article attached thereto. The system comprises an article response measurement device for measuring the article response when shaken at least one shaking frequency. The system also comprises a shaking device excitation measurement apparatus for measuring the shaking device excitation when shaken at at least one shaking frequency. The system further comprises a computing device for computing a correction factor based on the shaking device excitation relative to the article response and applying the correction factor to received article and shaking device excitation.

According to a third aspect of the invention, there is provided a method for determining resonance behavior of a component affixed to a resonance inducing device. The method comprises identifying component resonance behavior for a location on the component for at least one frequency, determining resonance inducing device excitation behavior for at least one location on the resonance inducing device for at least one frequency, computing a correction factor based on the component resonance behavior and the resonance inducing device excitation behavior at varying frequencies, said correction factor geometrically relating the component and the resonance inducing device, and applying the correction factor to data received for the component and the resonance inducing device.

According to a further aspect of the present invention, there is provided a method for compensating for non-translational motion of a component. The method comprises determining component frequency responses of the component at varying frequencies, determining motion device frequency excitation of a motion device employed to shake the component. The determining occurs at varying frequencies. The method further comprises computing a correction factor based on the component frequency response and the motion device frequency excitation and applying motion to the component and evaluating the quality of the correction factor by applying the correction factor to data from the component and the motion device.

These and other objects and advantages of the present invention will become apparent to those skilled in the art from the following detailed description of the invention and the accompanying drawings.

DETAILED DESCRIPTION OF THE INVENTION

The present system addresses resonance effects encountered when testing a suspension arrangement, which may comprise resonance effects associated with a single head on a disk drive suspension or multiple heads on a multiple-arm positioner depending on the application. The system and inventive aspects discussed herein may be employed in other shaking devices but are described with specific reference to head/suspension arm aspects.

The present disclosure will briefly describe the design wherein the head/suspension arrangement may be ultimately employed, followed by a detailed description of the resonance effect correction design.

The novel design presented herein may be used in association with a media reading/writing device, such as a HDD. The method and apparatus disclosed may be used in association with other devices including a drive head and support configuration while still in the scope of the present invention.

Figure 1:
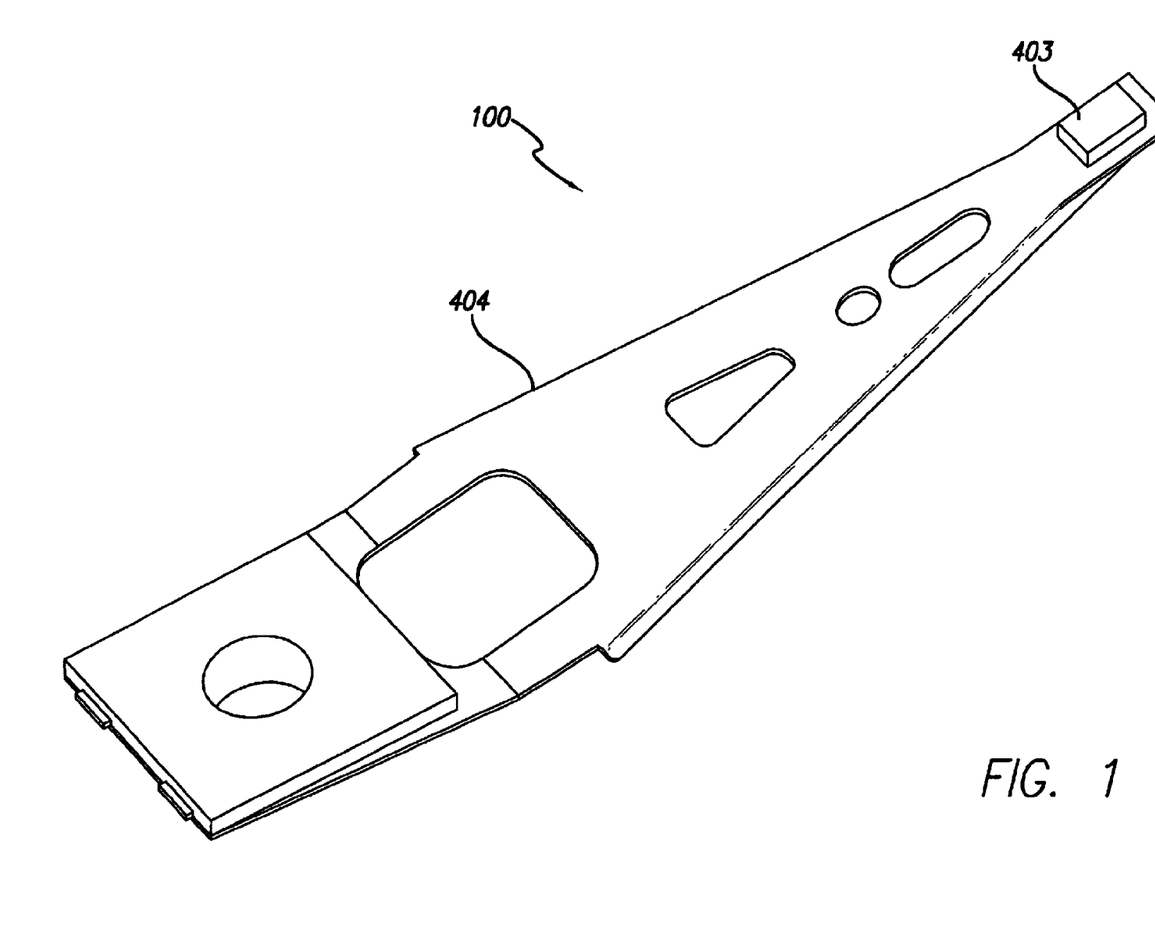
FIG. 1 illustrates a suspension and head, also called an HGA, that may be employed with the current invention.
Figure 2:
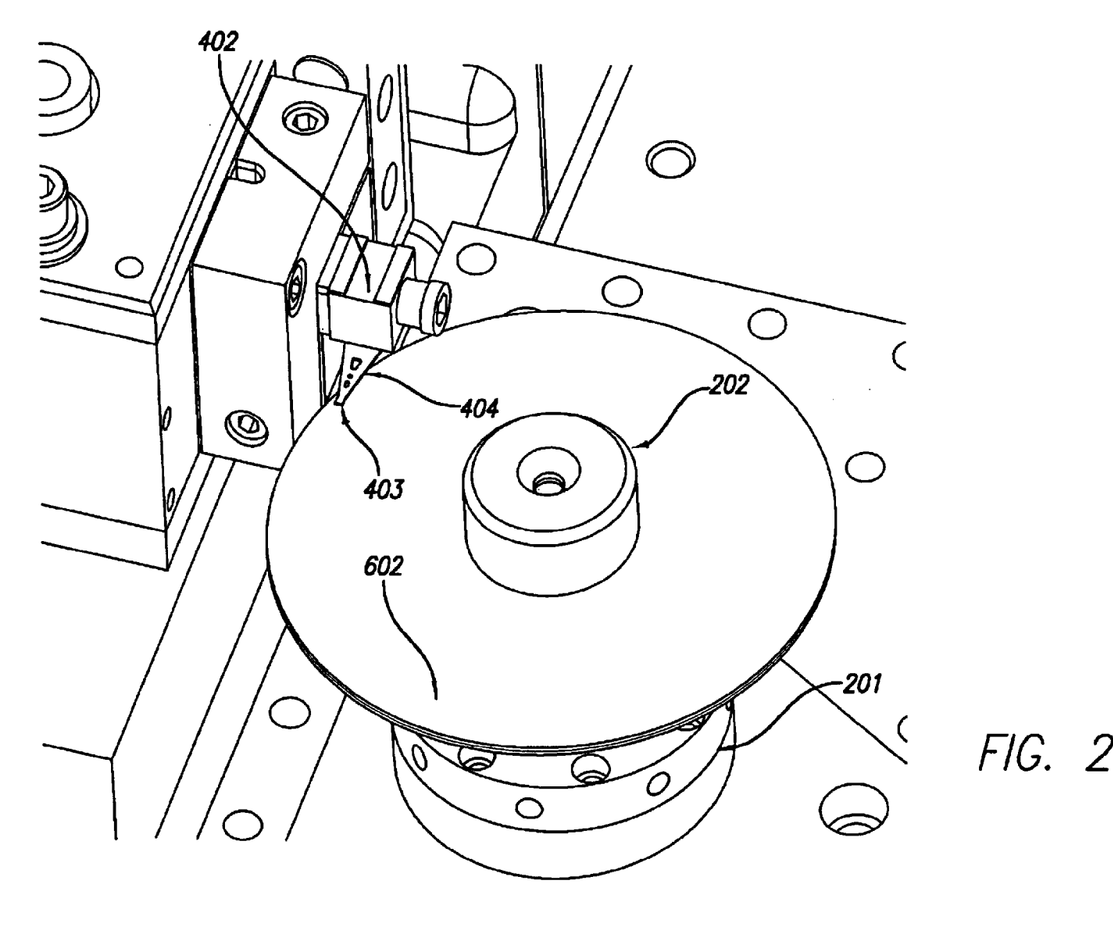
FIG. 2 illustrates a shaker device used with a disk and spindle arrangement in accordance with the current invention.
Figure 3:
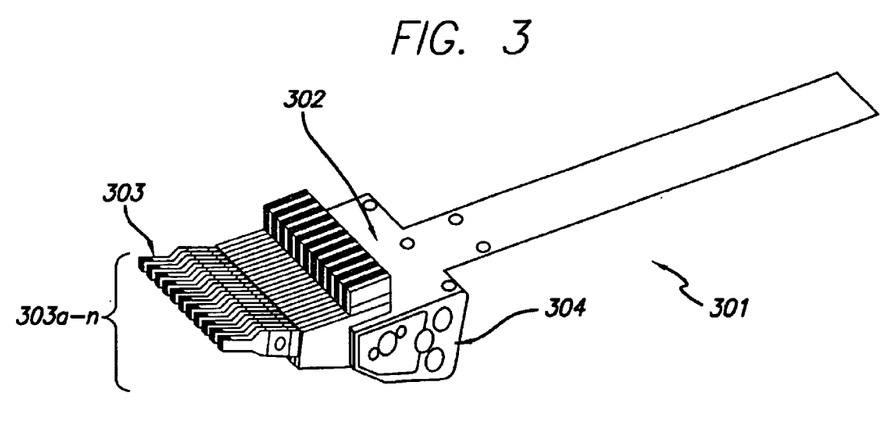
FIG. 3 presents a multiple HGA arrangement that may be utilized in accordance with one aspect of the current invention.

One such design with which the present method and apparatus may be used includes a single head and associated suspension arrangement as presented in FIG. 1, or alternately in a multiple head and multi-arm positioner arrangement as presented in FIG. 3. FIG. 2 illustrates a disk arrangement wherein a rotatable spindle 201 maintains the disk and is typically rotated by a motor (not shown). The rotating spindle may maintain a plurality of media disks, or may maintain a single disk or virtually any number of disks. In the configuration shown, one disk is employed and is secured by locking cap 202.

FIG. 3 presents a positioner 301 used to maintain a series of heads 303($a$) through ($n$), typically individual read/write heads that perform both reading and writing functions, where each head flies over the surface of media, which are typically hard disks.

Figure 4:
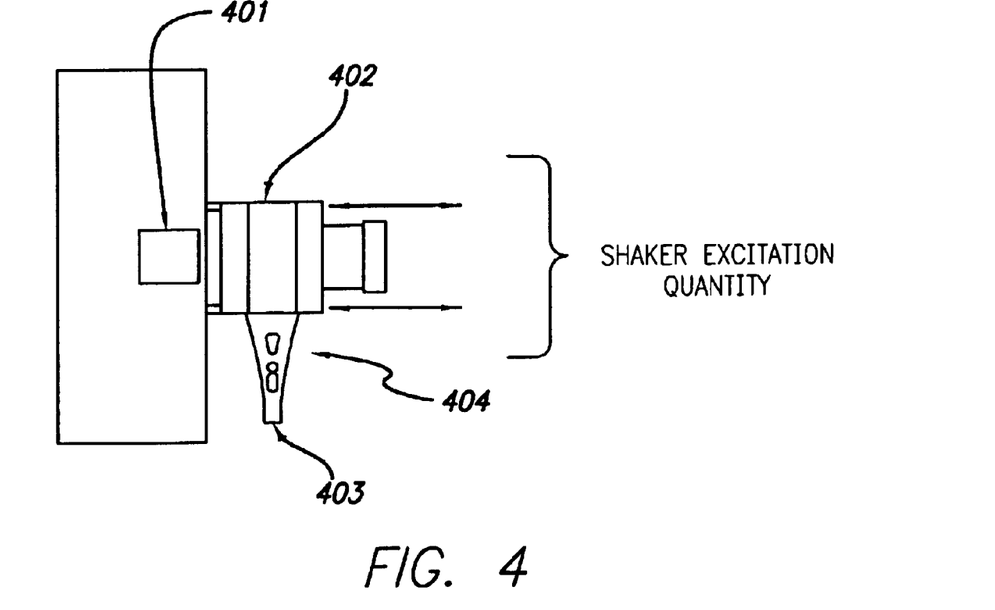
FIG. 4 illustrates a shaker device, accelerometer, and an article such as a suspension and head (HGA) used in one aspect of the current invention encountering ideal shaker motion.

FIG. 4 illustrates a suspension and head arrangement subjected to shaking motion and producing a shaker excitation quantity, with the arrows indicating an even movement of the shaker block. FIG. 5 illustrates a suspension and head arrangement subjected to uneven movement of the shaker block in the Z direction. In this view, the lower portion of the shaker block moves in a distance greater than the upper portion, inducing torque in the suspension and providing inexact resonance response recorded by accelerometer 401. The one dimensional values of the shaker excitation quantities are as reflected in FIGS. 4 and 5.

In the arrangement shown in FIGS. 4 and 5, shaker excitation amplitude is measured with the accelerometer 401, providing the acceleration of the shaker, suspension, and head measured at the base of the suspension as a function of time (a(t)). At the same time, the system has the ability to measure the response of the head at the remote end of the suspension using a laser interferometer (not shown). If the velocity of the head is v(t), the acceleration measured at the base of the suspension and the velocity of the head may be converted into Fourier representations a($\omega$) and v($\omega$), where $\omega$ is the frequency of the sinusoidal excitation and a($\omega$) v($\omega$) are the complex acceleration and velocity values at the frequency $\omega$. The resonance gain of the suspension is:

$$G(\omega) = 20\mathrm{Log}\left|\frac{\omega V(\omega)}{A(\omega)}\right| \tag{1}$$

This resonance gain is nonzero when the suspension flexes from resonance modes such as torsion and sway.

Figure 6:
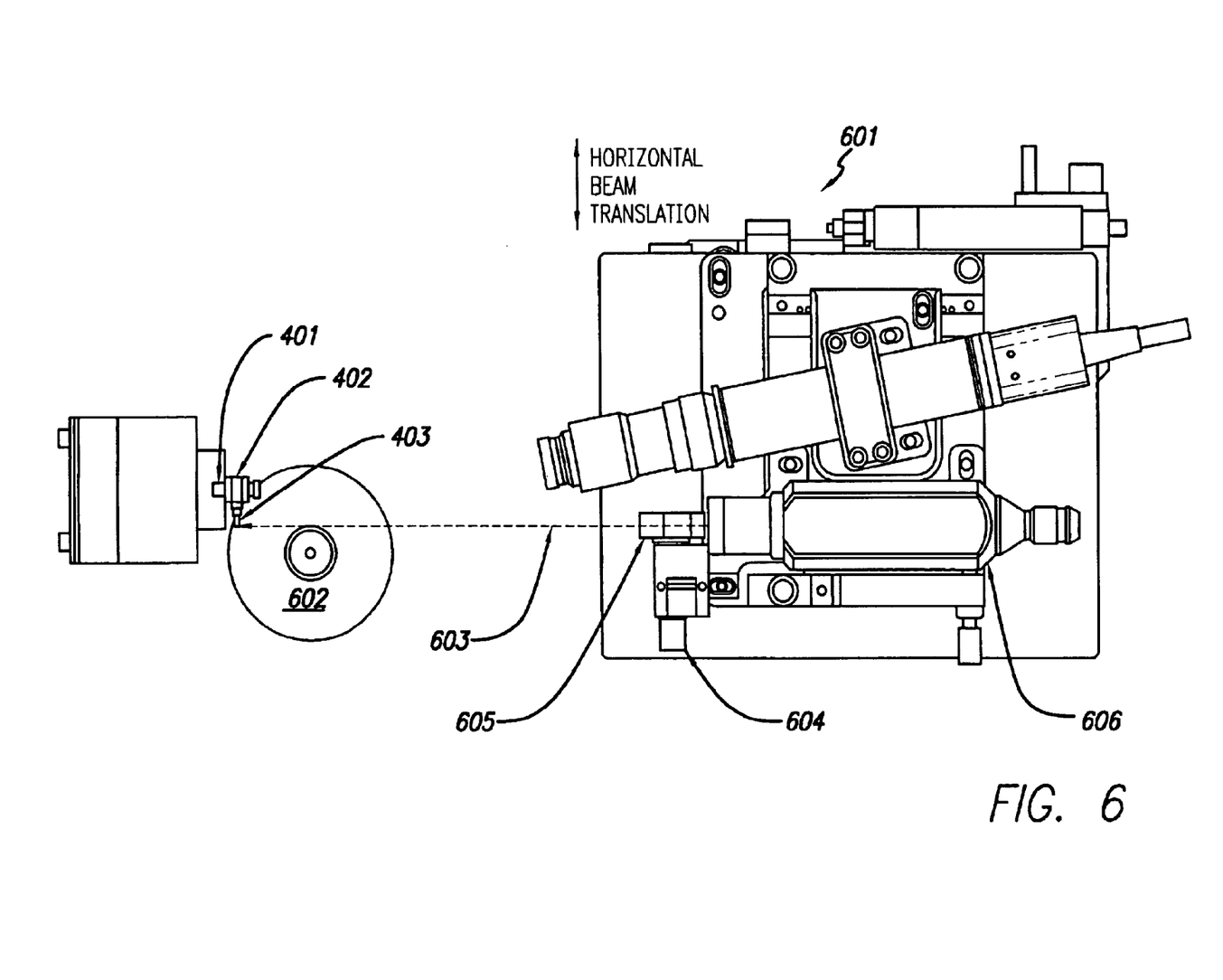
FIG. 6 is a top view of the interferometer arrangement used in accordance with one aspect of the current invention and measuring a point on the head.
Figure 7:
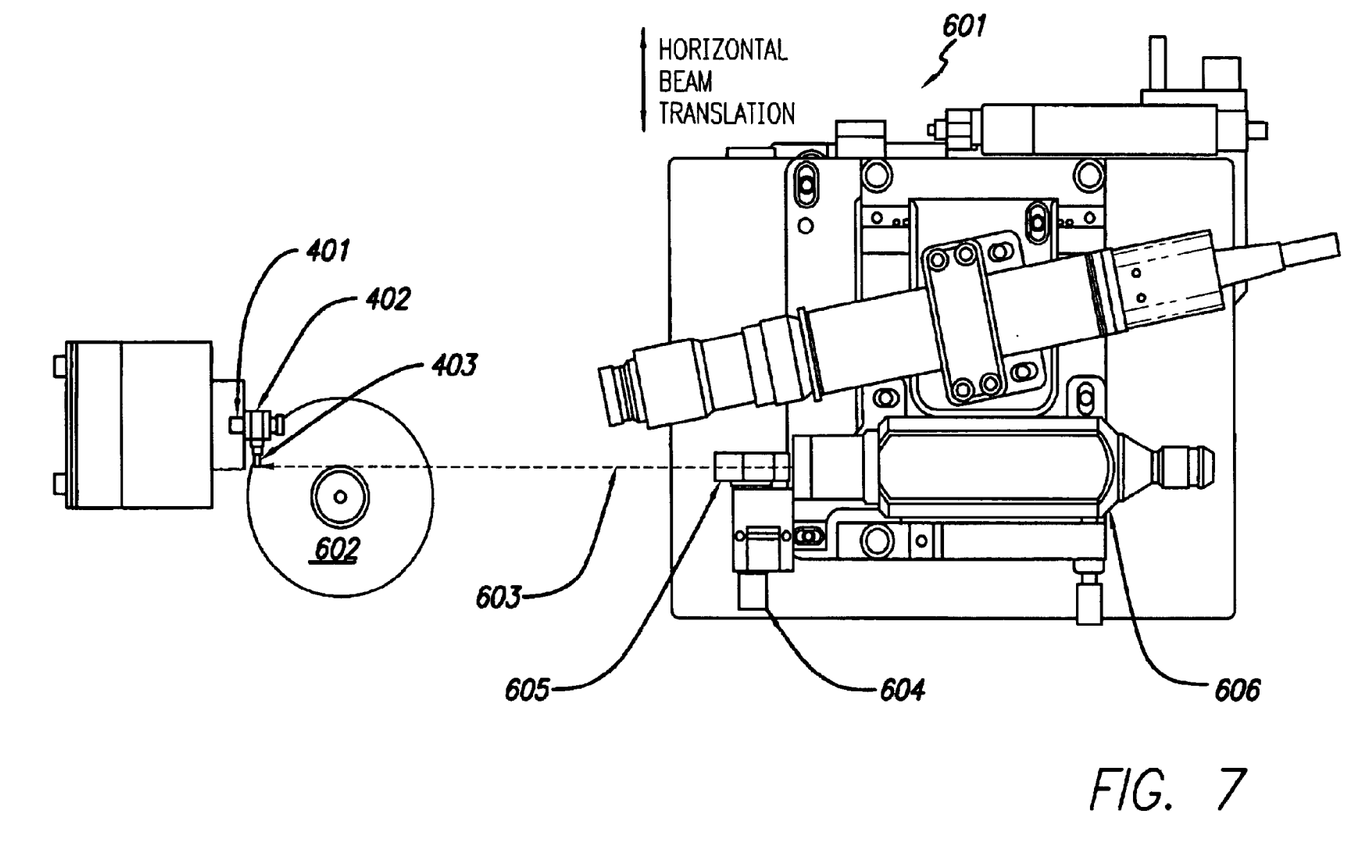
FIG. 7 shows a top view of the interferometer arrangement used in accordance with one aspect of the invention and measuring a point on the shaker block.
Figure 8:
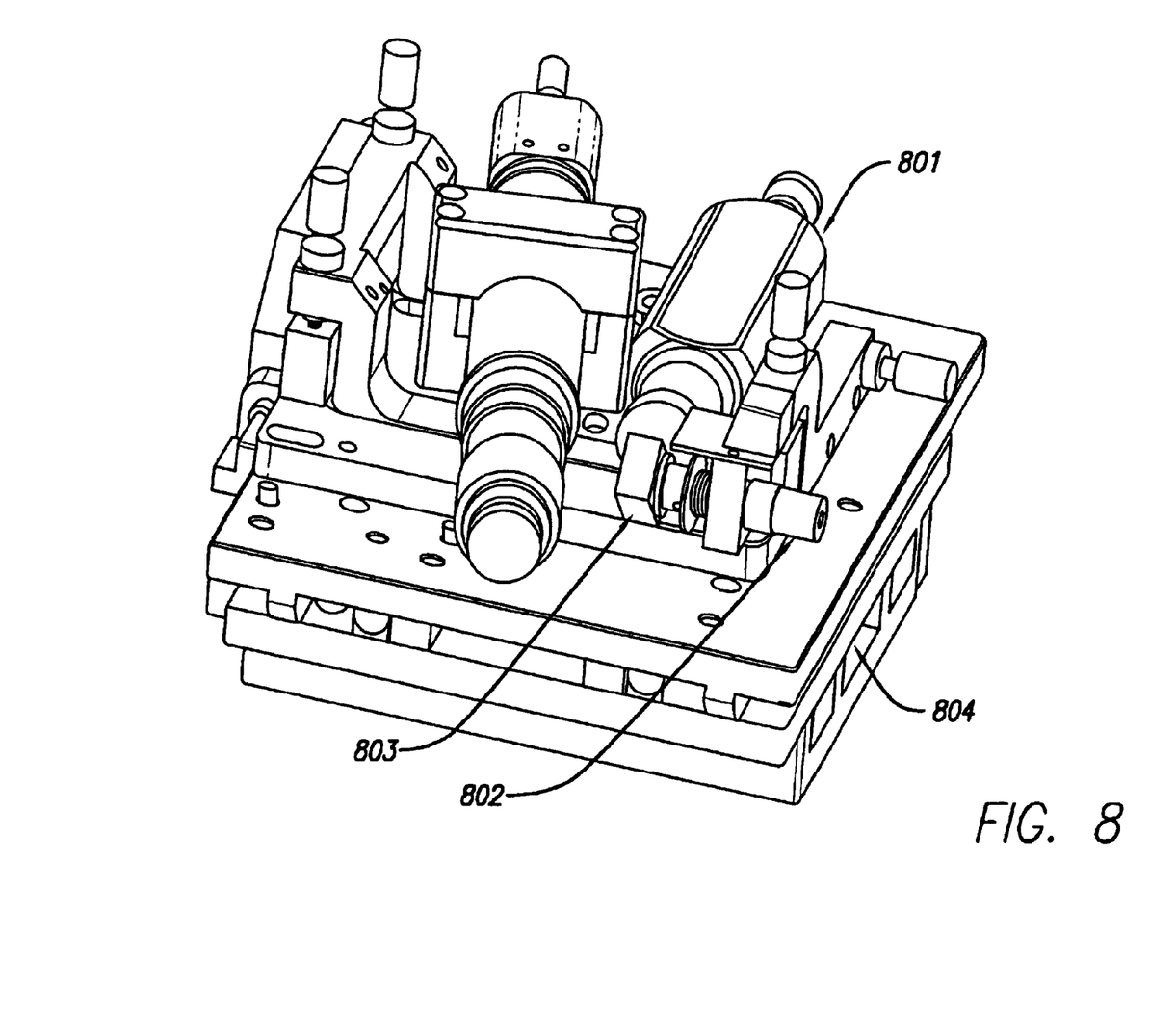
FIG. 8 illustrates a perspective view of one interferometer arrangement that may be employed with the invention disclosed herein.

FIG. 6 illustrates a top view of the overall system 601 including the laser interferometer 606 used to measure velocity and/or acceleration at the head 403. The system illustrated also includes the motor 604 and a prism 605 used for vertical beam alignment. FIG. 7 illustrates a top view of the overall system where the system and the laser beam 603 have been repositioned to enable measurement of the shaker block 402 rather than the head 403. The interferometer 606 positions a laser beam to a point, such as the tip of the head 403, which is reflected back to the system, and the returning light wave and delay thereof provides the amount of movement of the head over a fixed time period. Interferometer 606 performs typical laser interferometry functions, and thus acts as both a light energy emitter and sensor with respect to the laser beam 603 shown. Accelerometer 401, shaker block 402, and head 403 are as shown in FIGS. 6 and 7. As shown in FIG. 2, disk 602 may be located proximate the head. As shown in FIG. 8, interferometer device 800 includes laser 801, motor 802, and prism 803 used for vertical alignment. The arrangement is mounted on translation stage 804. When the measurement of the shaker block or shaker device 402 is desired, the laser beam 603 is translated horizontally to the position shown in FIG. 7.

Figure 9:
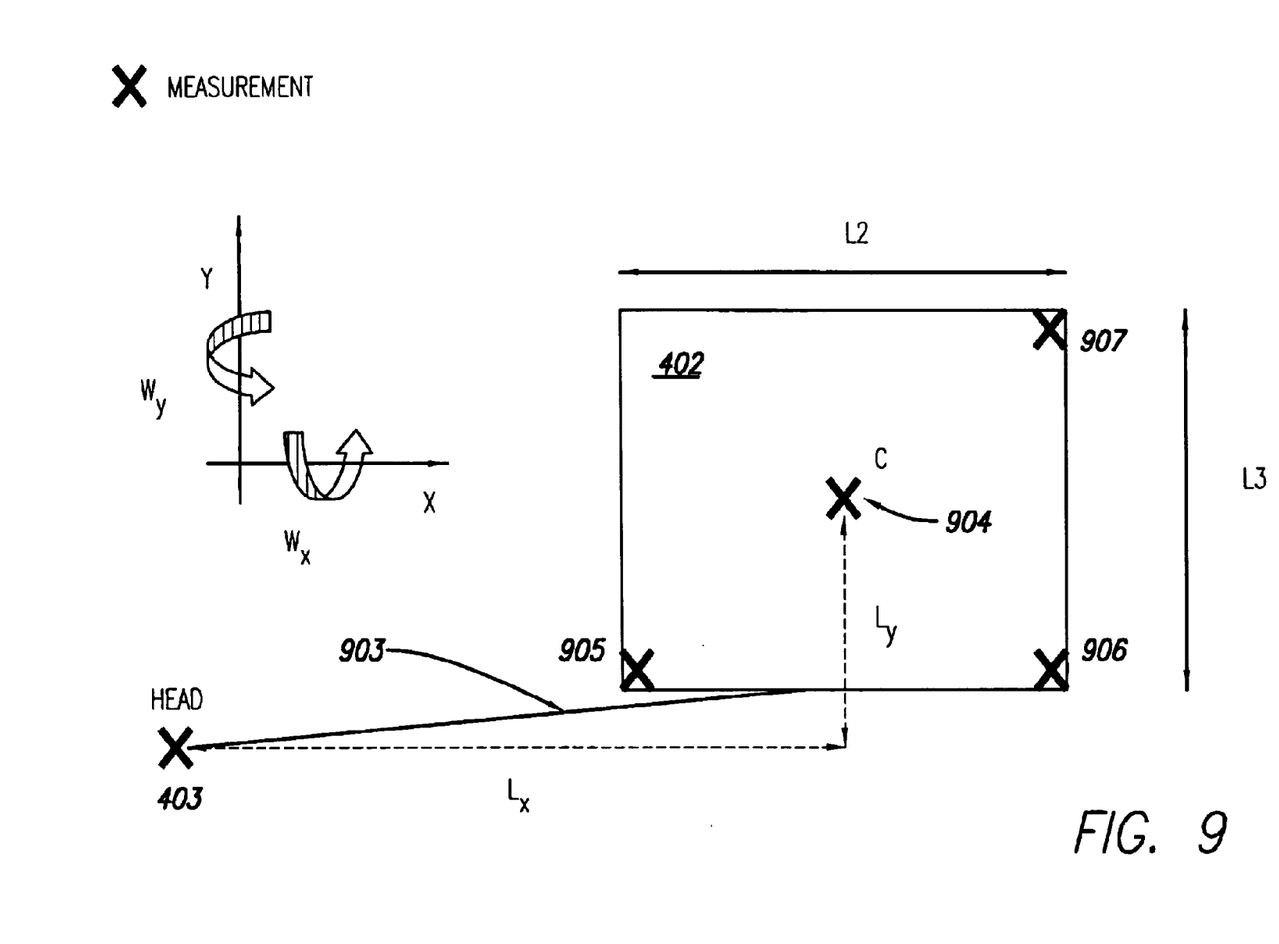
FIG. 9 is a view of three point correction geometry.

The shaker block 402 has typically been assumed to be a rigid body. In assuming that the shaker block 402 is a rigid body, it is further assumed that movement of a point on the shaker block 402 defines a local translational movement of the shaker block. Further, movement of multiple points on the face of the shaker block 402 provides greater knowledge of the movement of any point on the block. Movement of the block in the arrangement shown tends to induce non-translational motion in the HGA and/or head 403 attached to the shaker block 402 that is unrelated to the naturally occurring resonance modes inherent in the HGA. These aberrant non-translational motions have been observed to consist of mainly two rotations. From FIG. 9, theoretical shaker block 402 is centered at known point C, while head 403 is located at a distance therefrom. The distance from the center of the shaker block to the head is $L_y$ in the y direction and $L_x$ in the x direction. Off axis motions have generally been observed in two rotational aspects, namely an up-and-down rotation having a rotational velocity $w_x$ and a left-and-right rotation (having a rotational velocity $w_y$. The positive orientation of x and y and the rotational velocities $w_x$ and $w_y$ are as shown in FIG. 9.

A device such as a shaker has six degrees of freedom. The present design addresses non-translational motion in part by essentially ignoring translation effects in X and Y directions, and rotation about the Z axis, as measurable resonance gain from excitation in these directions is essentially zero in the arrangement presented. The remaining three degrees of freedom, which are translation in the Z direction and rotation about the X axis ($w_x$) and Y axis ($w_y$), dominate coupling to the main resonance modes of the suspension in the arrangement illustrated.

Data in the foregoing design, such as that shown in FIGS. 4 and 5, may be measured and received in various forms. One form in which data may be received is in terms of a transfer function, representing the ratio of the response to the excitation, or the ratio of the head motion to the motion of the base):

$$\text{Transfer function} = \frac{V_H}{V_T} \quad (2)$$

where $V_H$ represents the velocity at the head and $V_T$ is the velocity at the base. If these quantities are decomposed into their Fourier frequency components, the transfer function can be written as:

$$\text{Transfer function} = \frac{V_H(\omega)}{V_T(\omega)} \quad (3)$$

The velocity $V_T$ of the base can be deduced from the acceleration $A_c$ of the base, i.e.

$$V_T = \frac{A_c(\omega)}{j\omega} \quad (4)$$

where $j=\sqrt{-1}$. Using this, the transfer function can be written as:

$$\text{Transfer function} = \frac{j\omega V_H(\omega)}{A_c(\omega)} \quad (5)$$

The transfer function may be determined by two measurements, namely the velocity of the head measured by a laser interferometer and the acceleration of the base measured by an accelerometer.

The transfer function is defined in terms of frequency, and is measured after subjecting the hardware to vibration to various frequencies and taking measurements therefrom. For example, the arrangement of FIG. 4 may be exposed to a low frequency vibration. The acceleration at the accelerometer 401 and velocity of the head 403 is measured and saved. Vibration may be halted and subsequently continued, or may not be halted and simply continued. The continuation of vibration may be at a second frequency, wherein measurements are again taken. This frequency changing and measurement continues through the range of available frequencies. As noted, the problem with these measurements is the inability to know a more complete description of the excitation of the base, in particular its rotational motion.

Correction of the head response transfer function based on knowledge of input motion is made in the present system in one of two general manners, namely three point correction or two point correction. Three point correction is employed in the situation where two rotations are considered added to the main translation. Two point correction considers only one rotation to the main translation. The type of processing available and the types of modes observed during shaking, as well as the construction of the shaking device and the suspension/head are factors considered in determining whether to apply two or three point correction.

Three point correction is illustrated in FIG. 9. Head 403 is adjoined to suspension 902, with shaker block 402 having a center point 904. The distance from the head to the center of the shaker device is $L_x$ and $L_y$. Various points on the shaker block may be chosen for measurement purposes, but the present arrangement employs measurement points 905, 906, and 907, with the distance between measurement points 905 and 906/907 equal to $L_2$ and the distance between points 905/906 and 907 equal to $L_3$. The velocity in the Z direction (i.e. perpendicular to the plane of FIG. 9) at each of these points with respect to center point 904 are as follows:

$$V_1 = V_T - w_y(L_2/2) - w_x(L_3/2)$$

$$V_2 = V_T - w_y(L_2/2) + w_x(L_3/2)$$

$$V_3 = V_T + w_y(L_2/2) + w_x(L_3/2) \quad (6)$$

where $V_T$ is the translational velocity in the Z direction. $V_1$ is the velocity at point 905, $V_2$ is the velocity at 906, and $V_3$ is the velocity at 907. Solving for the translational velocity and the two rotational velocities, $$V_T = \frac{V_1 + V_3}{2} \quad (7)$$

$$w_x = \frac{V_3 - V_2}{L_3}$$

$$w_y = \frac{V_2 - V_1}{L_2}$$

Velocity at the head 403 is:

$$V_H = V_T - w_y(L_X) - w_x(L_Y) \quad (8)$$

Replacing $w_x$ and $w_y$ by the associated velocity differences divided by lengths, and writing the resultant equation in terms of transfer functions provides:

$$V_H = V_T\left(1 + \left(2\frac{L_x}{L_2}\right)\frac{\frac{j\omega V_1}{A_c} - \frac{j\omega V_2}{A_c}}{\frac{j\omega V_1}{A_c} + \frac{j\omega V_3}{A_c}} + \left(2\frac{L_Y}{L_3}\right)\frac{\frac{j\omega V_2}{A_c} - \frac{j\omega V_3}{A_c}}{\frac{j\omega V_1}{A_c} + \frac{j\omega V_3}{A_c}}\right) \quad (9)$$

where $A_C$ is the acceleration measured by the accelerometer 401. For any i in the set 1, 2, 3, . . . , H, the $i^{th}$ transfer function can be denoted by:

$$Ci = \frac{j\omega Vi}{Ac} \quad (10)$$

Using Equation 10, Equation 9 may be re-written as:

$$V_H = V_T\left(1 + \left(2\frac{L_x}{L_2}\right)\frac{C_1 - C_2}{C_1 + C_3} + \left(2\frac{L_y}{L_3}\right)\frac{C_2 - C_3}{C_1 + C_3}\right) \quad (11)$$

For a $V_{Hm}$ representing the velocity measured by the laser and Ac the acceleration measured at the accelerometer, setting $A_H = J\omega V_H$, $j\omega V_T = Ac$, $$\frac{j\omega V_{Hm}}{Ac} = C_H,$$

the resultant transfer function relating the velocity measured by the laser at the head to the geometrically implied acceleration at the head is:

$$\frac{j\omega V_{Hm}}{A_H} = C_H \frac{1}{\left(1 + \left(2\frac{L_x}{L_2}\right)\frac{C_1 - C_2}{C_1 + C_3} + \left(2\frac{L_y}{L_3}\right)\frac{C_2 - C_3}{C_1 + C_3}\right)} \quad (12)$$

The value on the right side of Equation 12 is referred to as the corrected transfer function.

Figure 11:
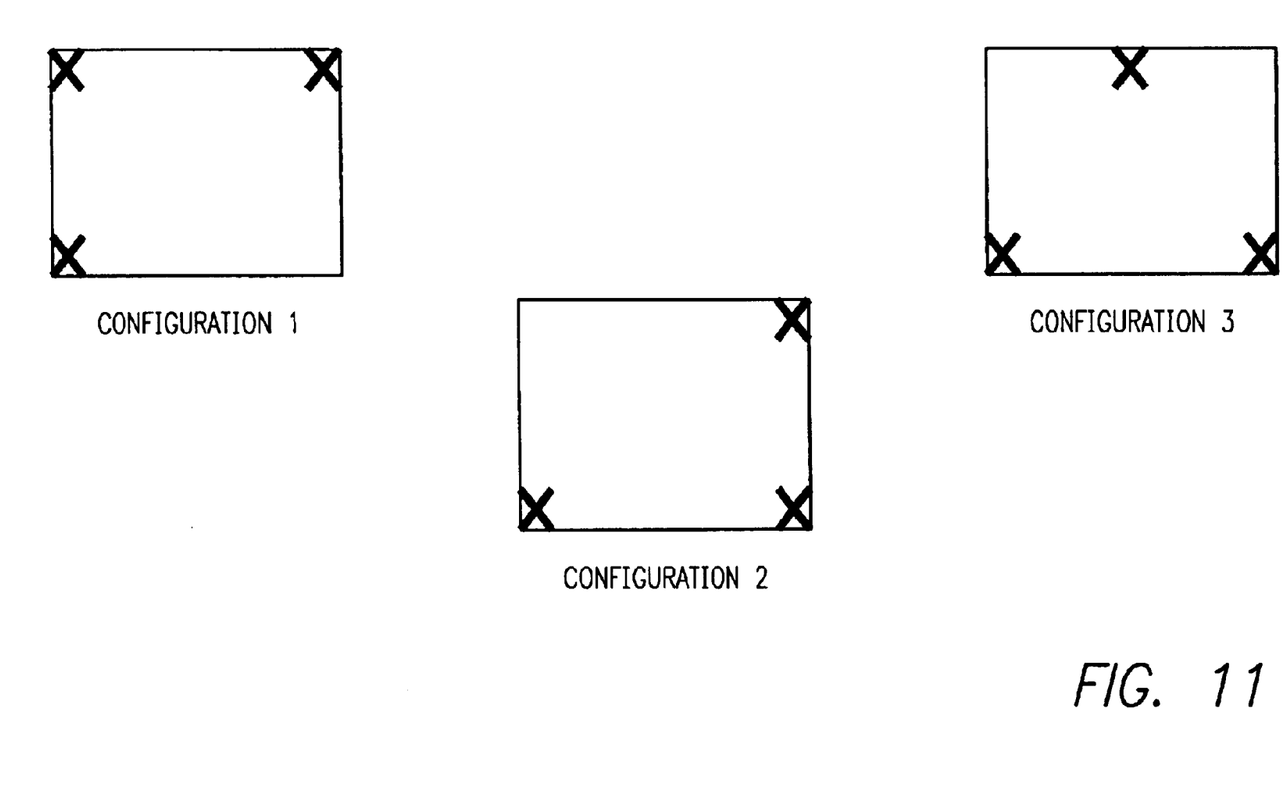
FIG. 11 presents possible configurations used for three point correction.

If the top middle point of the shaker block is used for the third measurement as shown in FIG. 11, the corrected transfer function becomes:

$$\frac{j\omega V_{Hm}}{A_H} = C_H \frac{1}{\left(1 + \left(4\frac{L_x}{L_2}\right)\frac{C_1 - C_2}{2C_3 + C_1 + C_2} + \left(2\frac{L_y}{L_3}\right)\frac{C_1 + C_2 - 2C_3}{2C_3 + C_1 + C_2}\right)} \quad (13)$$

Figure 10:
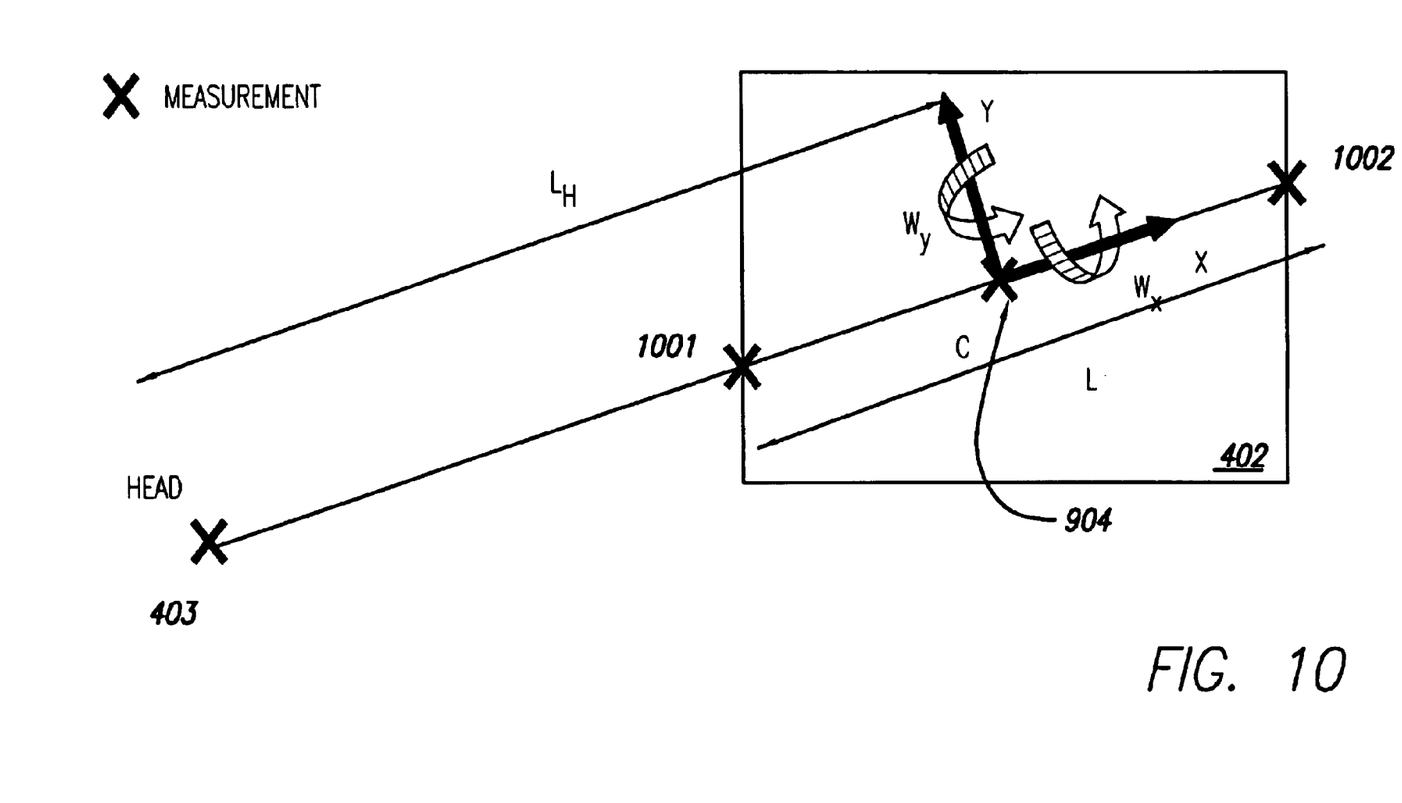
FIG. 10 illustrates two point correction geometry.

From Equation (12) or (13), the measured transfer function called $C_H$ in Equation (12) and (13), is multiplied by a correction factor to determine the corrected transfer function. Two point correction is illustrated in FIG. 10. Measurement points 1001 and 1002 are collinear with the head 403 and center point 904. $w_x$ in this configuration has no effect at the head 403 since the distance from the head 403 to the X axis is zero. The relevant rotational velocity is thus designated by w. Translational velocity at points 1001 and 1002 are:

$$V_1 = V_T + wx(L/2)$$

$$V_2 = V_T - wx(L/2) \quad (14)$$

where $V_1$ is the velocity at point 1001, $V_2$ is the velocity at 1002, and $V_T$ is the translational velocity in the Z direction (i.e. perpendicular to the plane of FIG. 10).

Solving and using the previous calculations, the corrected transfer function relating velocity measured by the laser at the head to the geometrically implied acceleration at the head is:

$$\frac{j\omega V_{Hm}}{A_H} = C_H \frac{1}{\left(1 + \left(2\frac{L_H}{L}\right)\frac{C_1 - C_2}{C_1 + C_2}\right)} \quad (15)$$

This is denoted as the corrected transfer function for two point correction. Again, $C_H$ represents the measured transfer function relating $V_{Hm}$, the velocity of the head measured by the laser, and Ac, the acceleration measured at the accelerometer, equal to $$\frac{j\omega V_{Hm}}{Ac}.$$

The value to the right of $C_H$ in the equation above represents the correction factor which when multiplied by $C_H$ yields the corrected transfer function.

The foregoing two and three point correction values relate to the gain $G(\omega)$ in the following manner. Corrected acceleration is described by the foregoing correction factors. For example, in two point correction, the term $$\left(1 + \left(2\frac{L_H}{L}\right)\frac{C_1 - C_2}{C_1 + C_2}\right)$$

may be multiplied by the measured acceleration at the accelerometer to produce the geometrically implied acceleration at the head, $$A_H(\omega) = A_C(\omega)\left(1 + \left(2\frac{L_H}{L}\right)\frac{C_1 - C_2}{C_1 + C_2}\right) \quad (16)$$

The aforementioned term describes the extra acceleration contributed by a combination of the lever arm 905 to the head 403 and the twisting of the shaker plane. The term is equal to one if no tilting exists.

If this term is reasonably constant on repetition of the measurement, it may be stored and used to compute a corrected suspension gain $G_c(\omega)$:

$$G_C(\omega) = 20\text{Log}\left|\frac{\omega V_{Hm}(\omega)}{A_H(\omega)}\right| \quad (17)$$

Hence corrected gain $G_c$ is a function of the frequency, velocity at the head, and the geometrically implied acceleration at the head, and either the two point or three point correction factor or geometric values outlined above.

In operation, the arrangement of FIGS. 6 and 7 is subjected to vibration across various frequencies. Both the accelerometer 401 and the laser take initial readings for acceleration at the accelerometer 401 and velocity at the head 403, respectively. Based on these initial readings, the system determines the foregoing two point and/or three point correction factors. These correction factors may then be evaluated for adequate performance, such as subjecting the head and suspension combination to further vibrations and applying the correction factors, and determining the actual gain of the determined signal. If the gain varies greatly from the expected signal gain, particularly if the gain and phase exceed that of the expected signal, a re-measurement and improved correction factor may be warranted. Gains and performance can vary over different frequencies. Certain frequencies where the correction factor is applied may produce worse responses than other frequencies, so tuning the correction factors may be advantageous. The tuning of correction factors, and specifically the determination of gain and frequency responses at different frequencies is typically within the realm of those skilled in the art.

The result of the foregoing description is a more accurate characterization of the frequency response of the head in different vibration conditions. This information may be used in a variety of ways, including but not limited to changing the overall design, changing individual component designs, minimizing the effects of the resonances encountered, and so forth. Thus the head and suspension response in a fully implemented HDD can be more accurately measured using the foregoing arrangement and methodology.

An alternate aspect of the present design is employing an acceleration value derived not from the accelerometer but from velocity measurements on the base of the shaking device. In this aspect, the resonance amplitude gain of the HGA structure is the ratio of the amplitude of the responding measured head displacement $D_{Hm}$ versus the amplitude of an applied displacement $D_H$ of a known element, such as the block or base to which the HGA is attached. As in the aspect presented above, the ratio of these amplitudes is given for each frequency of a Fourier decomposed spectrum of frequencies. Thus resonance gain may be defined as a transfer function, or alternately on the logarithmic scale as Gain, according to the following equations:

$$\text{Transfer function} = D_{Hm}/D_H \quad (18a)$$

$$\text{Gain} = 20 * \log(D_{Hm}/D_H) \quad (18b)$$

Acceleration is the derivative of velocity, and velocity is the derivative of displacement. Thus these quantities are related by a multiplication by $j\omega$, such that head velocity $V_H$ equals head displacement DH multiplied by $j\omega$, and head acceleration $A_H$ equals head velocity $V_H$ multiplied by $j\omega$. Further, measured head velocity $V_{Hm}$ equals measured head displacement $D_{Hm}$ multiplied by $j\omega$, and measured head acceleration $A_{hm}$ equals measured head velocity $V_{Hm}$ multiplied by $j\omega$. Thus resonance gain can be described as ratios of displacements, velocities, and/or accelerations, such as:

$$\text{Transfer function} = D_{Hm}/D_H = V_{Hm}/V_H = A_{Hm}/A_H \quad (19)$$
$$= j\omega V_{Hm}/A_H$$

$$\text{Gain} = 20 * \log(D_{Hm}/D_H) = 20 * \log(V_{Hm}/V_H) \quad (20)$$
$$= 20 * \log(A_{Hm}/A_H) = 20 * \log(j\omega V_{Hm}/A_H)$$

Again, the applied acceleration at the head may differ from the acceleration measured at the accelerometer 401. Acceleration and the associated velocity have the same tilting components. Thus, the relationship between the implied velocity at the head $V_H$ and translation velocity $V_T$ at the center of the block to which the HGA is attached is:

$$V_H = V_T\left(1 + \left(2\frac{L_X}{L_2}\right)\frac{C_1 - C_2}{C_1 + C_3} + \left(2\frac{L_Y}{L_3}\right)\frac{C_2 - C_3}{C_1 + C_3}\right) \quad (21)$$

while the relationship between the implied acceleration at the head and acceleration at the accelerometer, which is at the center of the block to which the HGA is attached, is similar:

$$A_H = A_C\left(1 + \left(2\frac{L_X}{L_2}\right)\frac{C_1 - C_2}{C_1 + C_3} + \left(2\frac{L_Y}{L_3}\right)\frac{C_2 - C_3}{C_1 + C_3}\right) \quad (22)$$

The terms in parentheses in the foregoing equations represent the geometrical equations accounting for angular rotation components. Stated another way, $$\frac{j\omega V_{Hm}}{A_H} = \frac{j\omega V_{Hm}}{A_C} \frac{1}{\left(1 + \left(2\frac{L_X}{L_2}\right)\frac{C_1 - C_2}{C_1 + C_3} + \left(2\frac{L_Y}{L_3}\right)\frac{C_2 - C_3}{C_1 + C_3}\right)} \quad (23)$$

From this, the alternate aspect of the present design uses a different measurement to extract the same resonance gain values. In place of using the accelerometer measured acceleration, the system measures the translational velocity on the block $V_T$ using the interferometer and subsequently deriving the gain. The translational velocity $V_T$ is derived from the average of velocities $V_1$ and $V_3$ measured at the aforementioned locations, so the two different measurement methodologies provide the same gain value by utilizing the displacement/velocity/acceleration frequency relationships presented above. In other words, use of the relationship:

$$j\omega V_T = A_C \quad (24)$$

yields the resonance gain derived based on the velocity measurements without use of the accelerometer measurement according to the following equation:

$$\frac{j\omega V_{Hm}}{A_H} = \frac{j\omega V_{Hm}}{j\omega V_T} \frac{1}{\left(1 + \left(2\frac{L_X}{L_2}\right)\frac{C_1 - C_2}{C_1 + C_3} + \left(2\frac{L_Y}{L_3}\right)\frac{C_2 - C_3}{C_1 + C_3}\right)} \quad (25)$$

$$= \frac{j\omega V_{Hm}}{j\omega V_T} \frac{1}{\left(1 + \left(2\frac{L_X}{L_2}\right)\frac{V_1 - V_2}{V_1 + V_3} + \left(2\frac{L_Y}{L_3}\right)\frac{V_2 - V_3}{V_1 + V_3}\right)}$$

where $V_T = \frac{V_1 + V_3}{2}$

The foregoing equation (25) removes reliance on $C_i$ from the above recited two point and three point correction equations, as the $C_i$ values, equal to $j\omega V_i/A_C$, cancel out the $A_C$ accelerometer measurements. The $A_C$ values drop out of the $C_i$ equations above when divided in the fashion presented. Thus the correction terms are based on the $V_i$ values representing the velocities at the points on the block. This obviates the need for accelerometer 401, and provides for the same level of correction with the use of the laser arrangement of FIGS. 6 and 7, used to measure head and block displacement, velocity, and acceleration.

In operation of this alternate aspect, the system first measures the head when exposed to vibrations at varying frequencies, and may measure head displacement, head velocity, and/or head acceleration. Subsequent to this measurement, the system is altered to evaluate the response of the block, or any other rigid device employed to shake the article, by measuring the displacement, velocity, or acceleration of the block at one or more points when exposed to different frequencies. These values, representing the excitations at varying frequencies, are employed to determine a correction factor according to the foregoing calculations. The result is a correction factor that may be employed to determine performance of the HGA without the need for an accelerometer attached to the shaking device.

While the invention has been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

What is claimed is:

1. A method for providing an enhanced response representation for an article mounted to a shaker device, comprising:

measuring an article response quantity at the article;

determining a shaker excitation quantity at the shaker device;

computing a correction factor geometrically relating the shaker excitation quantity to the article response quantity; and determining the response representation based on applying the correction factor to raw shaker and article data.

2. The method of claim 1, wherein the article comprises an HGA (Head Gimbal Assembly) comprising a head and suspension element, and the shaking device comprises a head resonance tester.

3. The method of claim 1, wherein said shaker excitation quantity measurement employs an accelerometer to measure acceleration of the shaker device.

4. The method of claim 1, further comprising revising the response representation based on expected response of the article at a particular frequency.

5. The method of claim 1, wherein said shaker excitation quantity determining comprises measuring velocity excitation of the shaker at a plurality of points on the shaker device.

6. The method of claim 5, wherein the plurality of points comprises two points on the shaker device.

7. The method of claim 5, wherein the plurality of points comprises three points on the shaker device.

8. The method of claim 5, wherein a light energy beam is employed to measure excitation velocity.

9. The method of claim 1, wherein response representation determining comprises applying the correction factor to determine a transfer function representing a frequency response at the article.

10. A system for determining an excitation representation of a shaking device having an article attached thereto, comprising:

an article response measurement device for measuring the article response when shaken at least one shaking frequency;

a shaking device excitation measurement apparatus for measuring the shaking device excitation when shaken at least one shaking frequency; and a computing device for computing a correction factor based on the shaking device excitation relative to the article response and applying the correction factor to received article response and shaking device excitation.

11. The system of claim 10, wherein the article response measurement device comprises a light energy emitter and sensor.

12. The system of claim 11, wherein the shaking device excitation measurement apparatus comprises an accelerometer.

13. The system of claim 11, wherein the shaking device excitation measurement apparatus comprises the light energy emitter and sensor.

14. The system of claim 10, wherein the correction factor is based on a geometric relationship between the shaking device and the article.

15. The system of claim 10, wherein the article response measuring device measures article velocity and the shaking device excitation measurement apparatus measures acceleration of the shaking device.

16. The system of claim 10, wherein the article response measuring device measures article velocity and the shaking device excitation measurement apparatus measures translation velocity of the shaking device.

17. The system of claim 10, wherein the shaking device measurement excitation apparatus measures responses for multiple points on the shaking device.

18. A method for determining resonance behavior of a component affixed to a resonance inducing device, comprising:

identifying component resonance behavior for a location on the component for at least one frequency;

determining resonance inducing device excitation behavior for at least one location on the resonance inducing device for at least one frequency;

computing a correction factor based on the component resonance behavior and the resonance inducing device excitation behavior at varying frequencies, said correction factor geometrically relating the component and the resonance inducing device; and applying the correction factor to data received for the component and the resonance inducing device.

19. The method of claim 18, wherein the component comprises an HGA (Head Gimbal Assembly) comprising a head and suspension element, and the resonance inducing device comprises a head resonance tester.

20. The method of claim 18, wherein said resonance inducing device resonance behavior determination employs an accelerometer to measure acceleration of the resonance inducing device.

21. The method of claim 18, further comprising:

determining a response representation based on applying the correction factor to data received for the component and the resonance inducing device; and revising the excitation representation based on expected response of the component at a particular frequency.

22. The method of claim 18, wherein said resonance inducing device excitation behavior determination comprises measuring excitation velocity of the resonance inducing device at a plurality of locations on the resonance inducing device.

23. The method of claim 22, wherein the plurality of locations comprises two points on the resonance inducing device.

24. The method of claim 22, wherein the plurality of locations comprises three points on the resonance inducing device.

25. The method of claim 22, wherein a light energy beam is employed to measure excitation velocity.

26. The method of claim 18, further comprising:

determining a response representation based on applying the correction factor to data received for the component and the resonance inducing device; and wherein response representation determining comprises applying the correction factor to determine a transfer function representing a frequency response at the component.

27. A method for compensating for non-translational motion of a component, comprising:

determining component frequency responses of the component at varying frequencies;

determining motion device frequency excitations of a motion device employed to shake the component, said determining occurring at varying frequencies;

computing a correction factor based on the component frequency response and the motion device frequency excitation; and applying motion to the component and evaluating the quality of the correction factor by applying the correction factor to data from the component and the motion device.

28. The method of claim 27, wherein said component comprises an HGA (Head Gimbal Assembly) comprising a head and suspension element, and the motion device comprises a head resonance tester.

29. The method of claim 27, wherein said motion device frequency excitation determination employs an accelerometer to measure acceleration of the motion device.

30. The method of claim 27, further comprising:

determining a response representation based on applying the correction factor to data received for the component and the motion device; and reevaluating the response representation based on expected response of the component at a particular frequency.

31. The method of claim 27, wherein said motion device frequency excitation determination comprises measuring excitation velocity of the motion device at a plurality of locations on the motion device.

32. The method of claim 31, wherein the plurality of locations comprises two points on the motion device.

33. The method of claim 31, wherein the plurality of locations comprises three points on the motion device.

34. The method of claim 31, wherein a light energy beam is employed to measure excitation velocity.

35. The method of claim 27, further comprising:

determining a response representation based on applying the correction factor to data received for the component and the motion device; and wherein response representation determining comprises applying the correction factor to determine a transfer function representing a frequency response at the component.

* * * * *